March 21, 1972     L. C. CESSNA, JR     3,651,187
EXTRUSION PROCESS
Filed Oct. 16, 1969
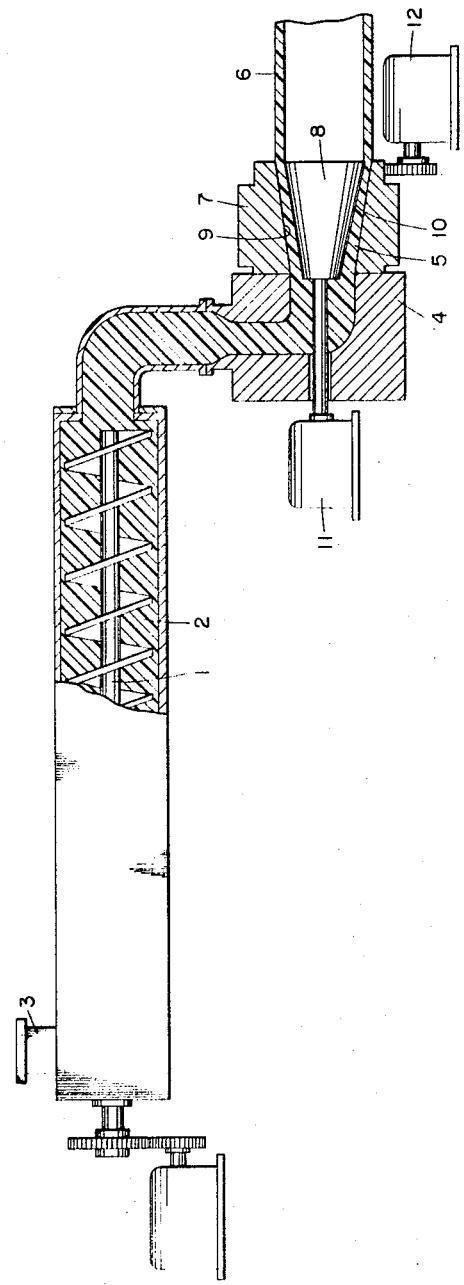
LAWRENCE C. CESSNA, JR.
INVENTOR
BY William S Alexander
ATTORNEY United States Patent Office 3,651,187
Patented Mar. 21, 1972

3,651,187
EXTRUSION PROCESS
Lawrence C. Cessna, Jr., Grendon Farms, Wilmington, Del., assignor to Hercules Incorporated, Wilmington, Del.
Filed Oct. 16, 1969, Ser. No. 866,913
Int. Cl. B29d 3/02
U.S. Cl. 264—108
3 Claims

ABSTRACT OF THE DISCLOSURE

A method is described for effecting circumferential orientation of reinforcing fibers in an extruded tubular plastic shape. The polymer, containing reinforcing fibers, is extruded through an annular tube forming die while being subjected to both longitudinal and circumferential velocity components. The longitudinal component has a gradient in the radial direction, while the circumferential component has gradients in the radial and longitudinal directions. A preferred means of accomplishing the process is by use of a conical rotating die.

---

This invention relates to a method and apparatus for preparing extruded cylindrical shaped articles containing fibrous reinforcing particles. In particular, it relates to preparing such articles wherein the fiber orientation can be controlled to suit a specified end use application. In a specific embodiment, it relates to the preparation of plastic tubular shapes having a high degree of reinforcing fiber orientation in the circumferential direction.

In processes previously known for extruding plastic pipe and tube the polymer is extruded through a stationary cylindrical annular die. With this arrangement, the frictional drag acting on the extrudate at the forming surfaces of the die creates a velocity gradient radially of the polymer cross-section near the forming surfaces. If reinforcing fibers are present in the polymer, some of these fibers can be disposed radially of the mass in such a way as to have one end located in a plane containing polymer traveling at a greater velocity than that in the plane surrounding its other end—i.e. one end can be near a forming surface and the other in the center of the mass. The faster moving polymer tends to sweep the fiber along with it and straighten it out in the direction of flow. The velocity gradient with this system, however, is significant only in the areas immediately adjacent to the polymer surfaces where the frictional drag is most apparent. Thus, whatever orientation takes place, takes place only near the surface of the polymer and this orientation is only in the longitudinal direction. However, in most applications for pipes, the principal loading on the pipe, such as would result from fluid pressure within the pipe, is in the circumferential or hoop direction. Thus it would be highly desirable to produce plastic pipe having reinforcing fibers oriented in the hoop direction.

One attempt to accomplish this objective is shown in U.S. Pat. 3,279,501 to Donald, which teaches extrusion of plastic pipe by means of a conventional annular extrusion die wherein the forming surfaces are adapted to rotate. When one or both of the forming surfaces are rotated, a circumferential velocity component is established in the liquid polymer, which velocity has a gradient in the radial direction—i.e., the circumferential velocity changes as the distance from the rotating surfaces increases. Here again, any fibers which have portions at different radial distances from the axis of the die can be subjected to different polymer flow rates with the faster moving fluid tending to pull the fibers along with it and the slower moving fluid acting as an anchor. This tends to pull the fibers which are subjected to the circumferential velocity into cylindrical surfaces of constant circumferential velocity within the channel cross-section. However, except at the forming surfaces, this rotation is not capable of imparting significant orientation to the fibers. Near the forming surfaces of the die, where there are both circumferential and longitudinal gradients, there will be some fiber orientation which will be in a helical direction, depending upon the relative size of the two gradients.

In accordance with this invention, it has been found that controllable hoop-wise orientation of the fibers can be accomplished in a tubular extrudate by the imposition of a longitudinal gradient onto the circumferential velocity component. The invention is a process for preparing fiber reinforced plastic tubular shapes which comprises extruding a synthetic polymer in viscous liquid form, and containing reinforcing fibers, through an annular die, said extrusion creating in the flow stream a longitudinal velocity component having a gradient in the radial direction relative to the longitudinal axis of the die, and simultaneously imposing upon said flow stream a circumferential velocity component having gradients in the radial and longitudinal directions. By radial in the context of this invention, is is intended to indicate a direction perpendicular to the forming surfaces.

In accordance with this invention, it has been found that the imposition of a longitudinal gradient on the circumferential velocity of the polymer can effect control of the orientation of the reinforcing fibers in the hoop-wise or circumferential direction around the pipe. In the same manner as hereinabove described, a reinforcing fiber is forced into a surface of revolution parallel to the forming surfaces of the die (i.e., it will avoid pointing in the radial direction) by the radial velocity gradients. Then, after being forced into such a surface, the fiber will be subjected to varying circumferential speeds if it is not perpendicular to the longitudinal axis of the die channel. Here again, the faster moving liquid will tend to drag the fiber into its plane and thus the fiber will be oriented into a single longitudinal and annular plane.

A preferred method of creating the necessary circumferential velocity and gradients thereof is by means of a conical annular die having die surfaces which either converge or diverge (i.e. increase or decrease in diameter longitudinally) in the direction of extrusion, at least one of which die surfaces is rotated. The linear speed of such a rotating die surface varies as the diameter varies, thus imparting the varying circumferential velocity component to the polymer along the length of the channel.

An apparatus suitable for carrying out the method of the invention is shown in the attached drawing which shows a conical annular rotatable die having a diverging die channel.

The apparatus depicted in the drawing comprises an extruder screw 1 adapted to pump molten polymer 2, fed via feed port 3 to a forming die 4 and through an annular channel 5 to form a tubular shape 6. The forming die 4 is comprised of a die body 7 and a conical mandrel 8 adapted to fit within the die body in such a way that the outer surface of the annular die channel is formed by the inner longitudinal surface 9 of the die body and the inner surface of the die channel is formed by the longitudinal surface 10 of the mandrel. The conical mandrel 8 and the die body 7 are adapted to be rotated by variable speed electric motors 11 and 12 respectively.

In the embodiment of the invention depicted in the drawing the thickness of the diverging annular die channel decreases from the inlet to outlet end in such a way as to maintain a constant annular cross-sectional area. This is the preferred embodiment inasmuch as it permits the maintenance of a constant average longitudinal velocity and, in the diverging die case, it is the easiest system in which to create and maintain a steady state non-turbulent condition. However, a diverging die in which the thickness of the annular die channel remains constant is also operative. In such a case, the cross-sectional area of the channel increases and there is thus created a longitudinal velocity gradient—i.e., the velocity decreases between the inlet and outlet ends of the channel. Under these conditions, the trailing end of a fiber tends to overtake its leading end and some orientation is effected. However, in such a system, flow disturbances are more likely in the die and control is thus made more difficult. It is also more difficult to maintain a desirable level of pressure throughout the die.

When a converging die channel is employed, similar principles apply. A constant cross-section area of the channel provides a constant average longitudinal velocity to the flow stream so that only the three principal velocity components discussed above operate on the fiber. However, if the thickness of the die channel remains constant, the longitudinal velocity increases as the stream approaches the outlet of the die. In this situation there is a tendency for the fiber to straighten out in the axial or flow direction, which creates difficulty in establishing the desired control of orientation.

When using the conical annular rotating die depicted in FIG. 1, it is possible to rotate either the mandrel alone or both the mandrel and the die body. Normally, both are rotated as this results in establishment of the required circumferential velocity gradients in the entire polymer mass more efficiently and thus imparts opposed helical orientation of the inner and outer extrudate surfaces desirable for balanced strength. Rotation of a single die surface will result in a single helical flow pattern producing predominate fiber orientation in a given direction.

While the primary purpose and intent of the invention is to provide a method of orienting the reinforcing fibers in the hoop-wise or circumferential direction, perpendicular to the axis, the method can be employed to effect a desired degree of orientation between substantially axial and substantially hoop-wise. The precise fiber orientation which is realized is a function of the relative magnitude of the gradients in the longitudinal and radial directions. These, as described, are determined by the throughput velocity, the rate of rotation of the die surfaces and the rate at which the conical die surfaces converge or diverge with respect to the longitudinal axis of the die.

In the following example, the invention is illustrated for a case where the throughput rate and the rate of divergence of the die surfaces are held constant while the rotation rates of the die surfaces are varied.

EXAMPLE

Stereoregular polypropylene flake (IV 2.5) was dry blended with chopped glass rovings ⅛" long to form a composition of 85% polymer and 15% glass. This composition was fed to a 1½ inch heated extruder such as that shown in the drawing and extruded through a conical annular rotating die to form a tube of 1.9375 in. O.D. and 1.750 in. I.D.

The die mandrel diameter was 1.75 inches at the exit lip, tapering to 1 inch at a point 2.125 inches behind the exit lip. The annular channel was 0.0935 inch thick at the output end and the outer die surface was tapered so that the cross-sectional area of the channel remained constant from a point 2 in. behind the exit lips to the exit. The rotatable portion of the die included the entire mandrel of 2.5 inches in length and the final 1.5 inches of the outer surface.

Using the described equipment, a series of tubes were extruded using the following constant conditions:

extruder barrel temperature—238° C.
die temperature—243° C.
screw speed—150 r.p.m.
average longitudinal velocity—25 in./minute Five runs were made under these conditions with varying inner and outer die surface rotation rates. Specimens of these tubes were tested for their tensile strength and 0.5% secant modulus using conventional testing methods. Results of these tests are recorded in the following table.

| Run No. | Tensile strength (p.s.i.) | | | Modulus (p.s.i.) | | | Die rotation ratio | |
|---|---|---|---|---|---|---|---|---|
| | Transverse | Longitudinal | Ratio | Transverse | Longitudinal | Ratio | Inner | Outer |
| 1 | 2,100 | 6,900 | 0.35 | 330,000 | 500,000 | 0.66 | 0 | 0 |
| 2 | 4,992 | 5,200 | 0.96 | 480,000 | 480,000 | 1.00 | 5 | 5 |
| 3 | 4,700 | 4,700 | 1.00 | 460,000 | 435,000 | 1.06 | 11 | 6 |
| 4 | 5,980 | 4,600 | 1.30 | 481,000 | 370,000 | 1.30 | 22 | 6.5 |
| 5 | 5,020 | 4,300 | 1.40 | 469,200 | 340,000 | 1.38 | 60 | 26 |

Orientation of the fibers is taking place in the example due to the rotation of the die surfaces as shown by the increase in transverse strength and modulus with respect to the longitudinal strength and modulus as the relative rotation rate (i.e., the sum of inner and outer rotation rates) increases.

Using the same die as in the above example at a lower throughput rate, a lower relative die rotation rate would be needed to create a fiber orientation predominantly in the transverse direction. Conversely, at a higher throughput, high relative rotation would be required. With a different die, having a different rate of convergence or divergence, it would be necessary to vary the relative rotation rate to achieve the same level of fiber orientation at the same throughput rate.

It will also be apparent that the method of the invention can be employed for preparation of fiber reinforced sheet material having a desired direction of orientation of the reinforcing fibers. The tube can be slit and laid flat to form a sheet in the same manner as is presently employed commercially. A sheet or film can thus be prepared having reinforcing fibers, if desired, at right angles to its longitudinal axis, a result previously attainable only at considerably greater effort than is here required. If desired, a thin unoriented film can be laminated to this sheet to give it smoother surfaces and improve its qualities.

It is not intended that the invention should be limited to practice with the preferred technique illustrated above for imparting the longitudinal gradient to the circumferential velocity. Any method of imparting such a gradient can be employed. For example, one can employ a cylindrical die having a rotatable mandrel and a segmented rotatable die body whose segments are individually rotated at increasing or decreasing rates from input to output end. The changing rate of rotation effects a circumferential gradient in the longitudinal direction. A rotating conical mandrel within a straight die can also effect the required circumferential gradient.

The method of the invention is applicable to any synthetic polymer which can be extruded in viscous liquid form and reinforced with fibrous reinforcing material. Exemplary polymers to which the method is applicable include polyolefins such as polyethylene and polypropylene, polyvinyl chloride, poly(ethylene terephthalate), and polyamides such as nylon. The invention is also applicable to thermoset plastics which can be extruded either in solution form or in the form of prepolymers prior to completion of curing.

The most frequently used reinforcing fibers are those of glass and asbestos. Other fibers which can be used include such materials as boron whiskers and graphite fibers or fibrils. Organic fibrils of short length can be used, provided that the fibrils do not melt at the extrusion temperature.

The method is effective with any fibers having an orientable configuration—i.e., any particles having a length to diameter ratio greater than unity. It is effective when the fibers are long relative to the thickness of the extrudate cross-section. However, such fibers would normally undergo some degree of orientation by conventional techniques since due to their length they would ordinarily have their ends in different planes and the odds would favor one end being in a plane near the surface where an orienting velocity gradient exists. Thus, it is with fibers that are short relative to the extrudate thickness that the invention is most effective. Many of such fibers are randomly disposed in the center of the extrudate mass and would not be exposed to any gradients using conventional prior art extrusion techniques. Using the instant method, such fibres are rapidly and efficiently oriented in the desired directions within an annular surface.

What I claim and desire to protect by Letters Patent is:

1. A process for preparing reinforced plastic tubular shapes which comprises extruding, through an annular forming means, a synthetic polymer in viscous liquid form containing reinforcing fibers, while rotating at least one forming surface of said annular forming means and varying the diameter of the annular forming means from input to output end thereof, said extrusion creating in the polymer flow stream a longitudinal velocity component having a gradient in the radial direction relative to the longitudinal axis of the forming means and simultaneously imposing upon said flow stream a circumferential velocity component having gradients in the radial and longitudinal directions, all of said gradients being maintained until the point at which said polymer egresses from the annular forming means.

2. The process of claim 1 where the cross-section area along the length of the forming means is held constant.

3. The process of claim 1 including the additional step of slitting the tube to form a film or sheet.

References Cited

UNITED STATES PATENTS

| | | | |
|---|---|---|---|
| 1,607,623 | 11/1926 | Higgins | 264—108 |
| 3,122,788 | 3/1964 | Lieberman | 264—176 C |
| 3,281,897 | 11/1966 | Mercer | 264—209 UX |
| 3,327,038 | 6/1967 | Fox | 264—209 |
| 3,349,437 | 10/1967 | Quackenbush | 18—14 |
| 3,388,196 | 6/1968 | Farrell | 264—209 X |
| 3,404,203 | 10/1968 | Donald | 264—108 |
| 3,472,923 | 10/1969 | Gerrard | 264—209 X |

ROBERT F. WHITE, Primary Examiner

A. M. SOKAL, Assistant Examiner

U.S. Cl. X.R.

264—209, 211